(12) United States Patent
Ryuzaki et al.

(10) Patent No.: US 11,131,272 B2
(45) Date of Patent: Sep. 28, 2021

(54) CARBURETOR INCLUDING A MANUAL FUEL CONTROL DEVICE

(71) Applicant: Yamabiko Corporation, Tokyo (JP)

(72) Inventors: Ikumin Ryuzaki, Tokyo (JP); Takumi Nonaka, Tokyo (JP); Tamotsu Saito, Tokyo (JP); Tomoyoshi Kudo, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 194 days.

(21) Appl. No.: 16/533,876

(22) Filed: Aug. 7, 2019

(65) Prior Publication Data

US 2020/0049106 A1 Feb. 13, 2020

(30) Foreign Application Priority Data

Aug. 10, 2018 (JP) .............................. JP2018-152124

(51) Int. Cl.

| | |
|---|---|
| *F02M 19/04* | (2006.01) |
| *F02M 9/10* | (2006.01) |
| *F02M 9/02* | (2006.01) |
| *F02M 17/40* | (2006.01) |
| *B29C 70/48* | (2006.01) |

(52) U.S. Cl.
CPC .............. *F02M 9/023* (2013.01); *F02M 9/10* (2013.01); *F02M 17/40* (2013.01); *F02M 19/04* (2013.01); *B29C 70/48* (2013.01)

(58) Field of Classification Search
CPC ................................. F02M 19/04; F02M 9/10
See application file for complete search history.

(56) References Cited

U.S. PATENT DOCUMENTS

| | | | |
|---|---|---|---|
| 4,360,481 A | 11/1982 | Kaufman | |
| 4,899,699 A * | 2/1990 | Huang | ................ F02M 61/163 123/730 |
| 5,948,325 A | 9/1999 | Yanaka | |
| 10,082,107 B2 * | 9/2018 | Pattullo | .................. F02M 19/04 |
| 2004/0007788 A1 | 1/2004 | Vimercati | |
| 2014/0299099 A1 | 10/2014 | Yoshizaki et al. | |
| 2016/0298551 A1 | 10/2016 | Matsumoto et al. | |
| 2017/0268458 A1 | 9/2017 | Hiranuma et al. | |
| 2018/0023514 A1 | 1/2018 | Nagata et al. | |

FOREIGN PATENT DOCUMENTS

JP H2-61358 A 3/1990

\* cited by examiner

*Primary Examiner* — Robert A Hopkins
(74) *Attorney, Agent, or Firm* — Kilyk & Bowersox, P.L.L.C.

(57) ABSTRACT

A needle valve body (220) has a needle hollow part (230) and a slit (232) extending in an axial direction and opened forward in a tip region. The carburetor body (B) has a body hole (202) receiving the needle valve body (220) in a longitudinally displaceable manner along an axis and a step-part circumferential edge (240a) formed in the body hole (202) and forming an orifice (250) with the slit (232) of the needle valve body (220). By operating the needle valve body (220) to adjust the size of the orifice (250), an amount of fuel supplied to a fuel discharge part (Fout) can be adjusted.

16 Claims, 15 Drawing Sheets

CARBURETOR INCLUDING A MANUAL FUEL CONTROL DEVICE

BACKGROUND OF THE INVENTION

The present invention relates to a carburetor generating an air-fuel mixture supplied to an engine main body and, more particularly, to a carburetor including a manual fuel control device for adjusting an air-fuel ratio of an air-fuel mixture.

An engine-driven working machine is equipped with an engine system including a carburetor. Patent Document 1 discloses a portable generator driven by an engine system with a carburetor. Patent Document 2 discloses a chain saw, a blower, and a bush cutter driven by an engine system with a carburetor.

The carburetor includes a fuel control device including a manual needle valve body as disclosed in Patent Documents 3, 4. Carburetors can be classified into two types depending on a type of an engine output control valve. One type is a rotary carburetor using a rotary valve (Patent Document 3), and the other type is a butterfly carburetor using a butterfly valve. The carburetor has an air-fuel mixture generation passage for generating an air-fuel mixture, a fuel discharge part for supplying fuel to the air-fuel mixture generation passage, and a fuel supply passage for supplying fuel to the fuel discharge part. The manual fuel control device is disposed in the fuel supply passage.

When a manufacturer ships an engine-driven working machine, an operator operates a fuel control device so as to eliminate variations due to individual differences. In a field, if necessary, the fuel control device may be operated to optimize an amount of fuel passing through the fuel supply passage in accordance with an environment.

Patent Document 5 proposes that in the rotary carburetor and the butterfly carburetor, an auxiliary fuel supply passage joining with a main fuel supply passage is prepared and that a manual fuel control device is disposed in the auxiliary fuel supply passage.

Manual fuel control devices including needle valve bodies can be classified into two types depending on a method of adjusting a fuel supply amount. A first type is a fuel control device having a "whole circumference orifice" formed on an entire circular outer circumferential surface of the needle valve body (Patent Document 7). A second type is a fuel control device having a "partial orifice" formed on a portion of the outer circumferential surface of the needle valve body (Patent Documents 3, 6, 8).

As described above, the carburetor has the air-fuel mixture generation passage for generating an air-fuel mixture. This air-fuel mixture generation passage is supplied with air filtered by an air cleaner to supply the air-fuel mixture to an engine main body. The butterfly carburetor generally has a slow-system fuel discharge part supplying fuel to the air-fuel mixture generation passage during low load, and a main-system fuel discharge part supplying fuel to the air-fuel mixture generation passage during high load. Patent Document 7 discloses a specific example in which fuel control device s are disposed in fuel supply passages of both the slow system and the main system.

FIGS. 21 and 22 attached to this description are diagrams for explaining an overview of a manual fuel control device 2 of a "whole circumference orifice" type disclosed in Patent Document 7. Reference numeral 4 indicates a needle valve body. A tip part 4a of the needle valve 4 is circular in cross section and has a tapered shape. A carburetor body 6 has a body hole 10 extending in an axis Ax direction of the needle valve body 4. The body hole 10 constitutes a portion of a fuel supply passage leading from a fuel source 12 to a fuel discharge part 14.

The body hole 10 has an upstream portion 10a having a relatively large diameter and a downstream portion 10b having a small diameter, and the upstream portion 10a communicates with the fuel source 12. The downstream portion 10b communicates with the fuel discharge part 14. A body step part 16 between the upstream portion 10a and the downstream portion 10b has a whole circumference of a circumferential edge 16a constituting a "fixed valve seat". An outer circumferential surface of the tapered tip part 4a of the needle valve 4 inserted into the body hole 10 constitutes a "movable valve body".

When an operator operates the needle valve body 4 to retract the needle valve body 4, the outer circumferential surface of the needle tip part 4a separates from the circumferential edge 16a of the body step part 16. As a result, an annular orifice 18 continuous over the whole circumference is formed between the needle tip part 4a and the body step part 16 (FIG. 22). When this annular orifice 18 is referred to as a "whole circumference orifice", fuel can be supplied through the whole circumference orifice 18 from the fuel source 12 to the fuel discharge part 14.

FIGS. 23 to 25 attached to this description are diagrams for explaining an overview of a manual fuel control device 30 of a "partial orifice" type disclosed in Patent Documents 3, 8. A conventional "partial orifice" type has a needle valve body 32 as shown in FIG. 32. A tip portion 32a of the needle valve body 32 has a solid columnar shape. The tip portion 32a has a needle fuel passage 34 formed by cutting a portion of the circumferential surface thereof in the axis Ax direction. The needle fuel passage 34 is V-shaped in cross section and has a shape in which a depth "Dp" and an opening width "Wg" increase toward the tip.

In the "partial orifice" type, the circumferential edge 16a (hereinafter referred to as a "step-part circumferential edge") of the body step part 16 has a portion of the whole circumference constituting a "fixed valve seat". By operating and advancing or retracting the needle valve body 32, a passage effective cross-sectional area of an orifice 36 (FIG. 25) defined by the needle fuel passage 34 having a V-shaped cross section and the step-part circumferential edge 16a can be changed. This orifice 36 is defined by a portion of the step-part circumferential edge 16a in the circumferential direction and is therefore referred to as a "partial orifice".

Assuming that the respective orifices 18, 36 of the "whole circumference orifice" type and the "partial orifice" type are set to the same passage effective cross-sectional area, the whole circumference orifice 18 of the "whole circumference orifice" type extends over the whole circumference of the step-part circumferential edge 16a. On the other hand, the partial orifice 36 of the "partial orifice" type is defined in a portion of the step-part circumferential edge 16a. Therefore, comparing a depth "Dall" (FIG. 22) of the whole circumference orifice 18 and the depth "Dp" (FIG. 25) of the partial orifice 36, the depth "Dp" of the partial orifice 36 is larger (Dall<Dp).

Patent Document 8 disclosing the "partial orifice" type has pointed out a problem of the "whole circumference orifice" type. Fuel may contain particulates that have passed through a filter. Dust and other small foreign materials mixed in the fuel may clog the whole circumference orifice 18. This is the problem of the "whole circumference orifice" type.

Patent Document 1: US2017/0268458A1
Patent Document 2: US2016/0298551A1

Patent Document 3: Japanese Laid-Open Patent Publication No. H2-61358
Patent Document 4: US2004/0007788A1
Patent Document 5: US2014/0299099A1
Patent Document 6: US2018/0023514A1
Patent Document 7: U.S. Pat. No. 5,948,325
Patent Document 8: U.S. Pat. No. 4,360,481

As is well known, global warming and environmental pollution are argued worldwide, and strict measures against exhaust gas are required for hand-held engine-driven work machines such as portable generators and chain saws.

Main bodies of recent carburetors are manufactured by a die-casting method. The die-casting method is a precision casting method of casting a molten metal by using a mold. Even precise die-cast products have certain allowable errors. The material of the carburetor body is generally an aluminum alloy. On the other hand, the needle valve body is manufactured from brass or iron and is subjected to a surface treatment by plating for a measure against alcohol fuel. This needle valve body also has a certain allowable error.

In the fuel control device 30 of the "partial orifice" type disclosed in Patent Documents 3, 8, the tip portion 32a of the needle valve body 32 (FIG. 23) has a solid columnar shape. The downstream portion 10b of the body hole 10 receiving the needle valve body 32 is made up of a hole having a circular cross section defined by an inner circumferential surface complementary to the outer circumferential surface of the needle tip portion 32a (FIG. 25). A slight clearance exists between the needle valve body 32 and the downstream portion 10b of the body hole 10. The size of the clearance varies depending on an individual difference of the carburetor and an individual difference of the needle valve body 32. The clearance between the needle valve body 32 and the body hole 10 is also variously changed depending on a position of the needle valve body 32 relative to the body hole 10, i.e., an advanced position or a retracted position.

Although the fuel adjusting device 30 of the "partial orifice" type is advantageous in that the orifice 36 is hardly clogged by dust and other small foreign materials mixed in the fuel, the fuel enters the clearance between the needle valve body 32 and the body hole 10, resulting in a phenomenon that an amount of fuel passing through the clearance changes depending on the position of the needle valve body 32. The fuel flowing into a fuel passage due to this phenomenon becomes an unpredictable additional disturbance factor with respect to the fuel regularly passing through the fuel passage, causing a problem that the fuel amount cannot linearly be adjusted by the position of the needle valve body 32, i.e., the opening area of the partial orifice 36.

Furthermore, the amount of fuel passing through the clearance causing the unpredictable disturbance factor is not stable and therefore becomes a factor deteriorating a reproducibility of fuel adjustment with the needle valve body 32.

SUMMARY OF THE INVENTION

An object of the present invention is to provide a carburetor including a manual fuel control device for adjusting an air-fuel ratio of an air-fuel mixture, capable of ensuring sealing between a needle valve body and a body hole receiving the needle valve body.

According to a first aspect, the present invention is characterized in that, in a carburetor including a fuel control device of the "partial orifice" type, a tip region of a needle valve body has a hollow structure to form in this hollow portion a needle fuel passage extending in an axis Ax direction inside the needle valve body and that a single slit extending in the axis Ax direction is disposed on a circumferential surface of the tip region of the needle valve body. The needle fuel passage and the slit are both opened on a tip surface of the needle valve body. The slit is opened to the needle fuel passage.

According to the first aspect of the invention, the hollow structure with the slit can provide the tip region of the needle valve body with a degree of freedom of expansion/contraction in the radial direction. This degree of freedom can be used for enhancing the sealing between the needle valve body and a body hole receiving the needle valve body.

Due to this characteristic of the needle valve body included in the present invention, even though the diameter of the tip portion of the needle valve body is designed to be larger than the diameter of the body hole, the needle valve body can easily be inserted into the body hole due to elastic deformation of the tip portion when the needle valve body is incorporated into the body hole.

In this regard, according to the present invention, since the tip portion of the needle valve body can be designed to have a large length dimension, a clearance can be narrowed between the needle valve body and the body hole, and a sealing area can be increased between the needle valve body and the body hole, so that the sealing can be enhanced. This includes an advantage that axial deviation of the tip portion of the needle valve body can be prevented at the time of adjustment of the needle valve body.

According to a second aspect, the present invention is characterized in that, in the manual fuel control device of the "partial orifice" type, a tip part of the needle valve body is provided with a ridge extending in the circumferential direction thereof. The ridge has a function of sealing between the needle valve body and the body hole receiving the needle valve body and also have a function of preventing axial deviation of the needle valve body.

The second aspect of the invention is applicable, in the carburetors including fuel control device rs of the "partial orifice" type disclosed in Patent Documents 3 and 8, to the needle valve body, i.e., the needle valve body 32 shown in FIG. 23 that is solid and provided with a needle fuel passage having a V-shaped cross section on a circumferential surface. The second aspect of the invention is also applicable to the needle valve body included in the first aspect of the invention described above, i.e., the needle valve body with the slit having the hollow structure.

The needle valve body included in the present invention may be made of metal as in the conventional case or is preferably manufactured from synthetic resin. When synthetic resin is used as the material of the needle valve body, manufacturing costs can be reduced as compared to needle valve bodies made of iron and brass. Conventional needle valve bodies made of iron and brass are subjected to a surface treatment by plating for a measure against alcohol fuel; however, the needle valve body included in the present invention is made of a resin material excellent in chemical resistance and therefor eliminates the need for this plating treatment.

Preferable embodiments of the present invention will now be described in detail with reference to the drawings. Effects and other objects of the present invention will become apparent from the following detailed description.

DETAILED DESCRIPTION OF THE PRESENT INVENTION

Figure 1:
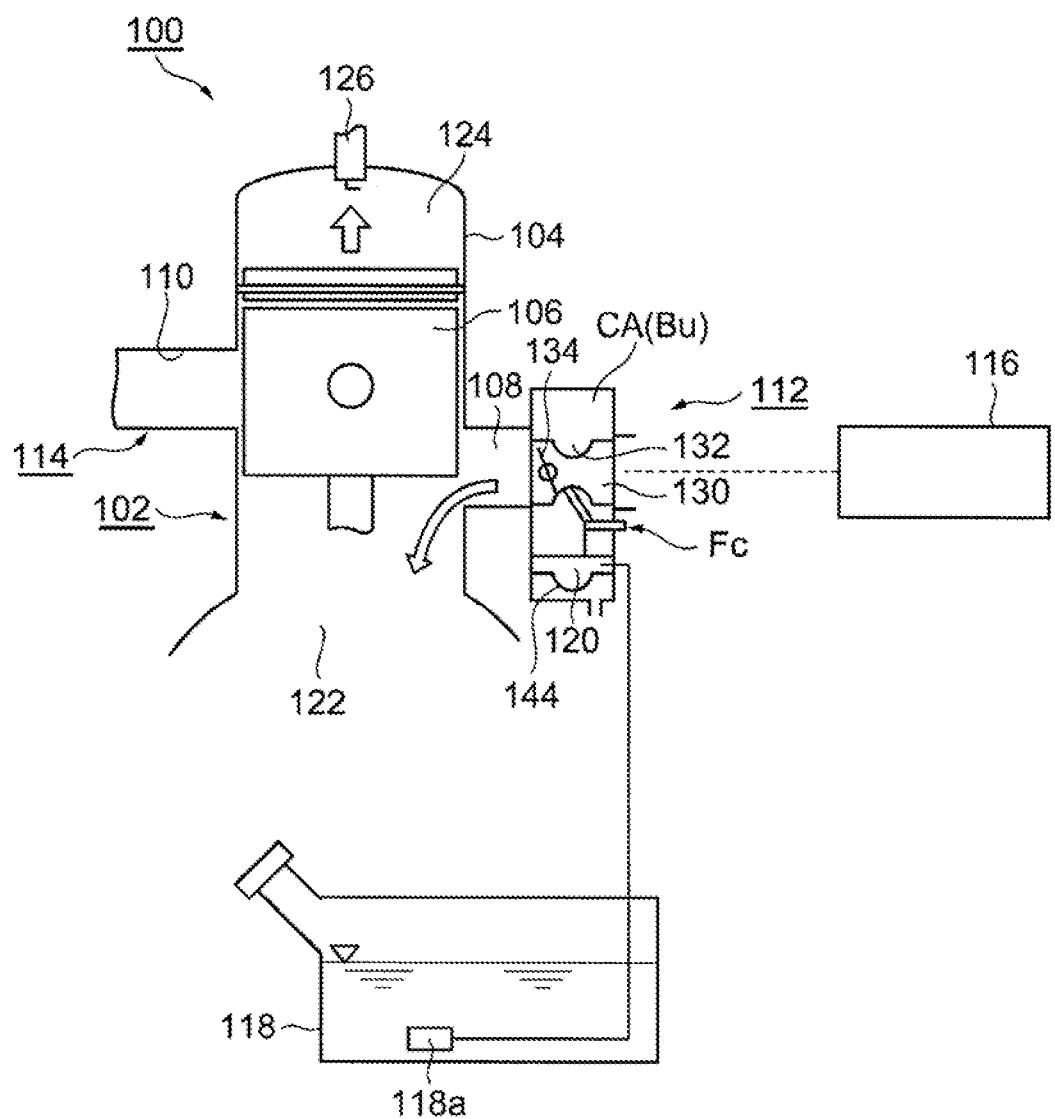
FIG. 1 shows a diagram for explaining an overview of an engine system to which a carburetor according to the present invention is applied.

FIG. 1 is a diagram for explaining an overview of an engine system 100 to which a carburetor according to the present invention is applied. In FIG. 1, the engine system 100 includes an internal combustion engine main body 102. The engine main body 102 is made up of an air-cooled single-cylinder two-stroke engine and is typically used as a power source for a brush cutter, a chain saw, or a portable generator. The engine main body 102 may obviously be made up of a four-stroke engine instead of the two-stroke engine.

The engine main body 102 has a piston 106 reciprocating in a cylinder 104. The cylinder 104 has an intake port 108 and an exhaust port 110, and these ports 108, 110 are opened and closed by the reciprocating piston 106. The intake port 108 is connected to an intake system 112, while the exhaust port 110 is connected to an exhaust system 114.

The intake system 112 includes a carburetor CA receiving air filtered by an air cleaner 116 to generate an air-fuel mixture. The shown carburetor CA is a butterfly carburetor employing a butterfly valve as an engine output control valve. Particularly when a butterfly carburetor is described, "(Bu)" is added to reference numeral "CA". The butterfly carburetor CA(Bu) is supplied with fuel filtered by a fuel filter 118a disposed in a fuel tank 118. The butterfly carburetor CA(Bu) includes a constant-pressure fuel supply chamber 120 of a diaphragm type, and the constant-pressure fuel supply chamber 120 constitutes a substantial fuel source.

When the intake port 108 is opened, the air-fuel mixture generated by the butterfly carburetor CA(Bu) is supplied to a crank chamber 122. The air-fuel mixture in the crank chamber 122 is pre-compressed by the descending piston 106 and introduced into a combustion chamber 124 in a scavenging stroke. The air-fuel mixture charged in the combustion chamber 124 is ignited by a spark plug 126.

Figure 2:
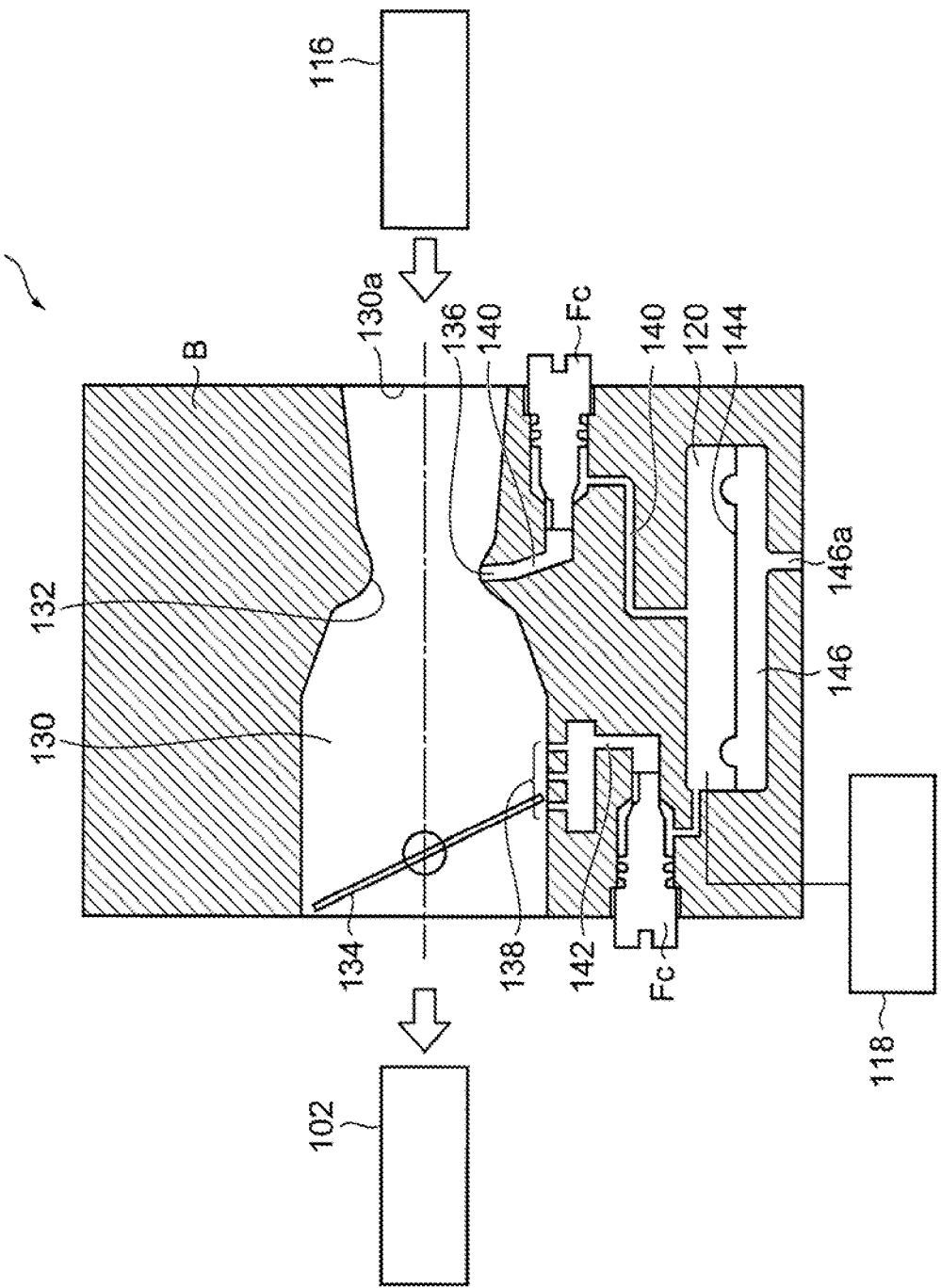
FIG. 2 shows a diagram for explaining an overview of a butterfly carburetor to which the present invention is applicable.

FIG. 2 is a cross-sectional view for explaining an overview of the butterfly carburetor CA(Bu). The carburetor CA(Bu) has an air-fuel mixture generation passage 130 for generating an air-fuel mixture, and an inlet 130a of the air-fuel mixture generation passage 130 receives the air filtered by the air cleaner 116. Reference numeral 132 denotes a venturi part, and reference numeral 134 denotes a butterfly throttle valve. A main fuel discharge part 136 is disposed in the venturi part 132, and a slow-system fuel discharge part 138 is disposed near the throttle valve 134.

The main fuel discharge part 136 is connected via a main fuel supply passage 140 to the constant-pressure fuel supply chamber 120. The slow-system fuel discharge part 138 is connected via a slow-system fuel supply passage 142 to the constant-pressure fuel supply chamber 120. The constant-pressure fuel supply chamber 120 is partitioned via a diaphragm 144 from an atmosphere chamber 146, and the atmosphere chamber 146 is always in communication with the atmosphere through an atmosphere opening port 146a.

Figure 3:
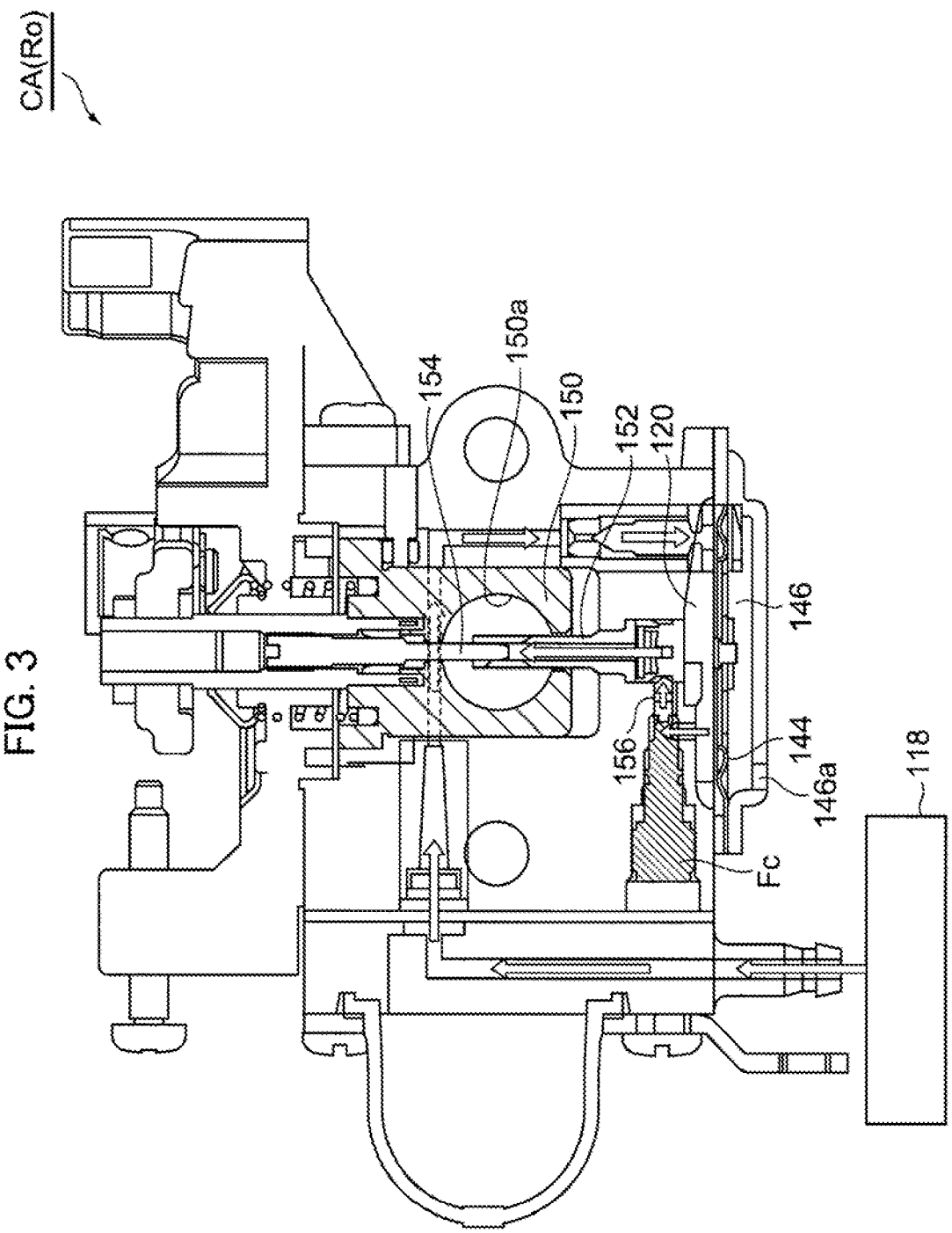
FIG. 3 shows a diagram for explaining an overview of a rotary carburetor to which the present invention is applicable.

The present invention is also applicable to a rotary carburetor shown in FIG. 3. When a rotary carburetor is specified, "(Ro)" is added to reference numeral "CA". In the description of the rotary carburetor CA(Ro), the same elements as those of the butterfly carburetor CA(Bu) are denoted by the same reference numerals and will not be described.

The rotary carburetor CA(Ro) has an axially rotatable cylindrical throttle valve 150. The cylindrical throttle valve 150 has a through-hole 150a extending in a direction orthogonal to a rotation axis, and the through-hole 150a constitutes the intra-carburetor air-fuel mixture generation passage 130.

The rotary carburetor CA(Ro) has a fuel discharge nozzle 152 disposed on the rotation axis of the cylindrical throttle valve 150. A control rod 154 for adjusting an amount of fuel to be discharged is inserted in the fuel discharge nozzle 152. The fuel discharge nozzle 152 is in communication with the constant-pressure fuel supply chamber 120 through a fuel supply passage 156.

A fuel control device Fc according to the present invention is applicable to the main fuel supply passage 140 and/or the slow-system fuel supply passage 142 included in the butterfly carburetor CA(Bu) described with reference to FIG. 2. The manual fuel control device Fc according to the present invention is also applicable to the fuel supply passage 156 of the rotary carburetor CA(Ro) described with reference to FIG. 3. Furthermore, the fuel control device Fc according to the present invention is applicable to the auxiliary fuel supply passage described above with reference to Patent Document 5.

In the following description of the fuel control device Fc, the term "fuel supply passage" collectively refers to the main fuel supply passage 140, the slow-system fuel supply passage 142, the fuel supply passage 156, and the auxiliary fuel supply passage disclosed in Patent Document 5, in which the fuel control device Fc can be disposed, and is denoted by reference numeral 200. The term "fuel discharge part" collectively refers to the main fuel discharge part 136, the slow-system fuel discharge part 138, and the fuel discharge nozzle 152 and is denoted by reference numeral "Fout".

Figure 4:
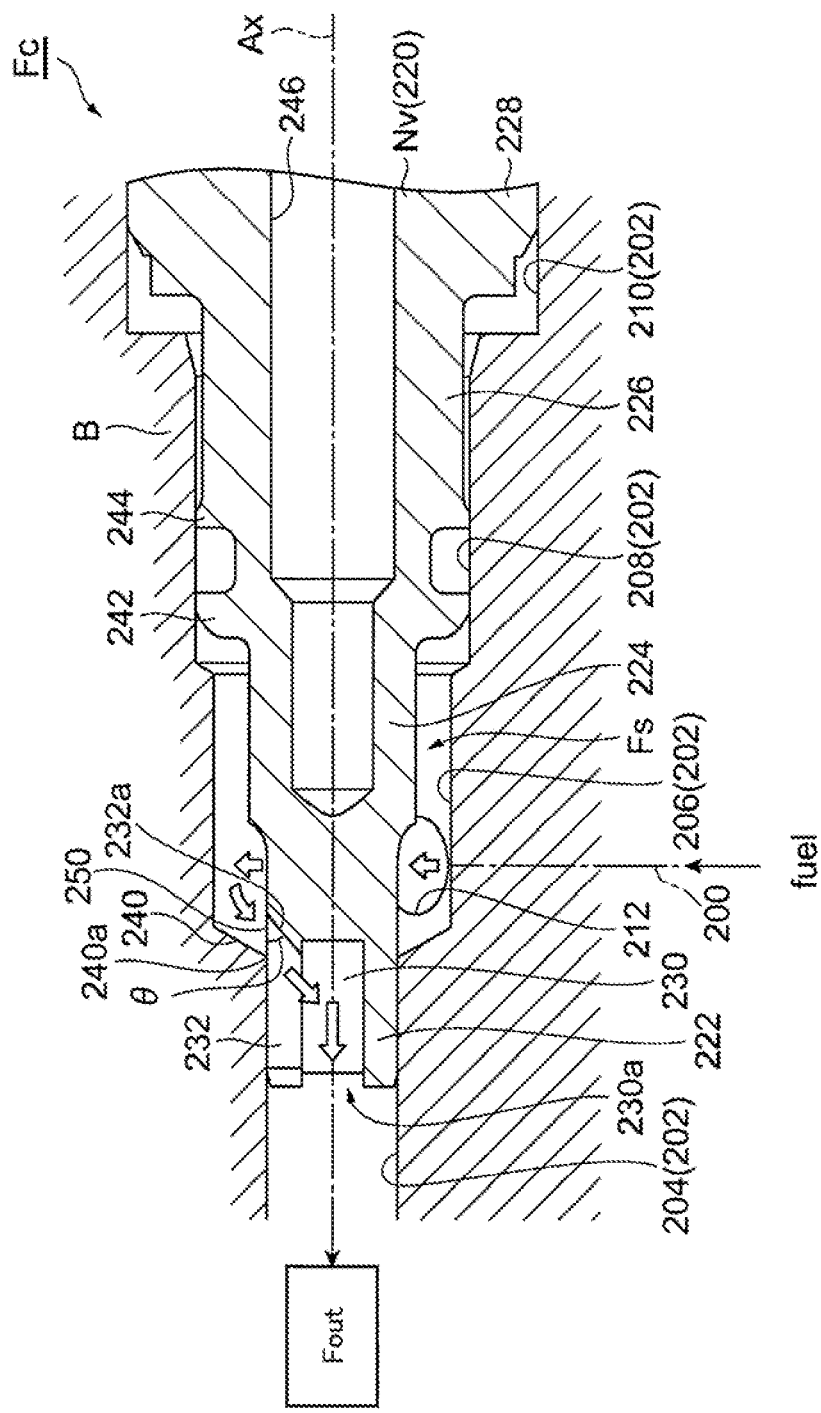
FIG. 4 shows a diagram for explaining an overview of a manual fuel control device according to the present invention, including a needle valve body that is a first specific example.

FIG. 4 is a diagram for explaining an overview of the manual fuel control device Fe according to the present invention. The fuel control device Fc has a body hole 202 formed in a carburetor body B, and this body hole 202 constitutes a portion of the fuel supply passage 200.

The body hole 202 has, in order in the axial direction, a small diameter space 204 on the fuel discharge part Fout side, a first intermediate space 206 larger in diameter than the small diameter space 204, a second intermediate space 208 large in diameter than the first intermediate space 206, and a rear end space 210 larger in diameter than the second intermediate space 208. The rear end space 210 is adjacent to the outside, and a thread is formed in the rear end space 210. A body IN-port 212 is opened in the first intermediate space 206 of the body hole 202. Fuel is supplied from the fuel source through the body IN-port 212 to the first intermediate space 206.

A needle valve body Nv is inserted in the body hole 202. The shown needle valve body Nv is a first specific example. To the needle valve body of the first specific example, reference numeral "220" is added for distinguishing from the needle valve bodies of the other specific examples described later. The first needle valve body 220 has, in order from a tip thereof, a cylindrical tip portion 222 relatively small in diameter, a cylindrical first intermediate portion 224 larger in diameter than the tip portion 222, a substantially cylindrical second intermediate portion 226 larger in diameter than the first intermediate portion 224, and a threaded portion 228 larger in diameter than the second intermediate portion 226, and the threaded portion 228 is screwed to the rear end space 210 of the body hole 202. An outer end surface of the screw portion 228 is provided with an operation part receiving a tool (not shown). The operator can axially rotate the needle valve body 220 by using the tool.

Figure 5:
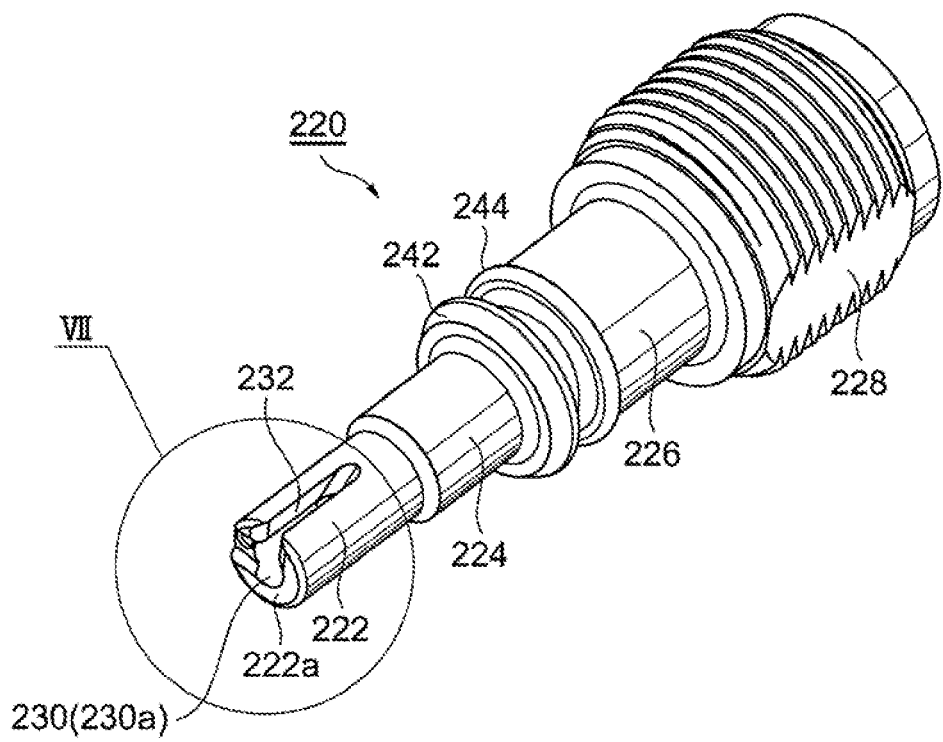
FIG. 5 shows a perspective view of the needle valve body of the first specific example.
Figure 6:
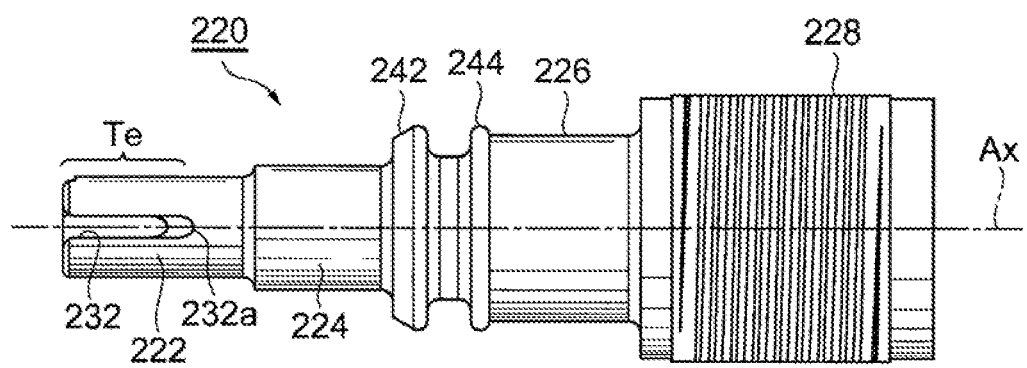
FIG. 6 shows a front view of the needle valve body of the first specific example.
Figure 7:
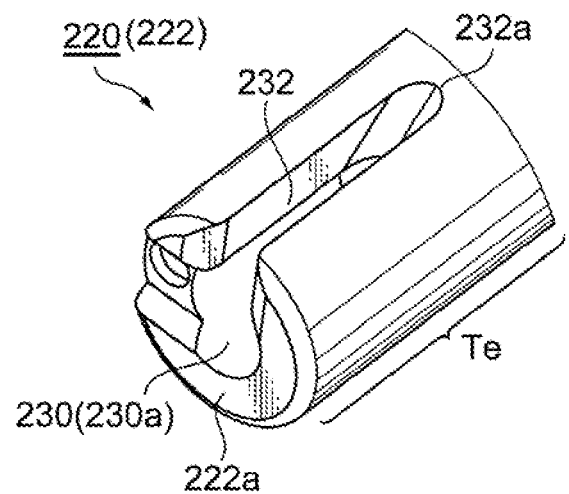
FIG. 7 shows an enlarged view of a tip portion of the needle valve body of the first specific example indicted by VII of FIG. 5.

FIGS. 5 and 6 are general views of the first needle valve body 220. FIG. 7 is an enlarged view of a tip portion of the first needle valve body 220. The tip portion 222 is relatively small in diameter, and has a hollow structure in a tip region Te (FIGS. 6 and 7) from a tip surface 222a to a middle portion. Therefore, the tip region Te has a hollow part 230 (hereinafter referred to as a "needle hollow part 230") opened in the tip surface 222a (see particularly FIG. 4). The needle hollow part 230 extends in the axis Ax direction and substantially constitutes a "needle fuel passage".

Furthermore, a slit 232 extending from the tip surface 222a in the axis Ax direction is formed on a circumferential surface of the tip region Te (FIG. 7). The slit 232 has an elongated substantially rectangular shape in a front view (FIG. 6). The slit 232 is opened forward in the needle tip surface 222a and communicates with the hollow part 230.

The needle hollow part 230 preferably has a circular cross-sectional shape around the axis Ax or may have an arbitrary cross-sectional shape such as a substantially rectangular cross section or a substantially semicircular cross section. The needle hollow part 230 may have the same cross-sectional shape in the axis Ax direction or may have a shape with a cross-sectional area gradually expanding toward a tip opening 230a of the needle hollow part 230.

Referring to FIG. 4, correlations between the parts of the body hole 202 and the parts of the needle valve body 220 are as follows.

(1) The small diameter space 204 of the carburetor body B receives the tip portion 222 of the needle valve body 220.

(2) The first intermediate space 206 of the carburetor body B receives the first intermediate portion 224 of the needle valve body 220. The first intermediate space 206 font's an annular fuel space Fs with the first intermediate portion 224. The fuel supplied from the fuel source enters the annular fuel space Fs through the body IN-port 212.

(3) In the carburetor body B, a circumferential edge (hereinafter referred to as a "step-part circumferential edge") 240a (FIG. 4) of a step part 240 formed between the small diameter space 204 and the first intermediate space 206 constitutes a "fixed valve seat".

(4) The second intermediate space 208 of the carburetor body B receives the second intermediate portion 226 of the needle valve body 220. The inner diameter of the second intermediate space 208 is set to a dimension slightly larger than the outer diameter of the second intermediate portion 226 of the needle valve body 220. In a front-end part of the second intermediate portion 226, two intermediate seal ridges 242, 244 are formed separately from each other in the axis Ax direction (FIGS. 5 and 6), and each of the intermediate seal ridge 242, 244 extends continuously in the circumferential direction. If the needle valve body 220 is made of a synthetic resin (e.g., liquid crystal polymer), the intermediate seal ridges 242, 244 having an outer shape slightly larger than the inner diameter of the second intermediate space 208 of the carburetor body B are preferably formed by integral molding. Obviously, the intermediate seal ridges 242, 244 may be made up of annular seal members.

Between the two intermediate seal ridges 242, 244, the first intermediate seal ridge 242 located at the front end of the second middle portion 226 of the needle valve body 220 substantially defines the annular fuel space Fs describe above. As a result, the air around the needle valve body 220 can be prevented from entering the annular fuel space Fs. Additionally, by disposing at least one of the two intermediate seal ridges 242, 244 in a longitudinally intermediate portion of the needle valve body 220, axial deviation of the needle valve body 220 can be prevented.

If the needle valve body 220 is made of brass or iron as in a conventional manner, a plating process may be performed from the tip to at least the position of the first intermediate seal ridge 242. Alternatively, the needle valve body 220 may be designed to be made of resin from the tip to at least the position of the first intermediate seal ridge 242.

(5) If the needle valve body 220 is made of resin, an annular seal member may be disposed between the two integrally molded intermediate seal ridges 242, 244.

(6) If the needle valve body 220 is made of resin, a rear hollow part 246 (FIG. 4) extending on the axis Ax may be disposed from the rear end of the needle valve body 220 over the second intermediate space 208. The rear hollow part 246 can be integrally molded by using a core when the needle valve body 220 is formed. With the rear hollow part 246, the second intermediate space 208 of the carburetor body B having the needle valve body 220 mounted thereon can be shaped into an annular shape in cross section. This can increase the molding accuracy of the outer circumferential surface of the second intermediate portion 226 of the needle valve body 220 and can reduce an amount of material of the needle valve body 220 to cut costs as compared to when the rear portion of the needle valve body 220 has a solid structure. The rear hollow part 246 may extend to the first intermediate space 206 of the carburetor body B as shown.

Referring to FIG. 4, the step-part circumferential edge 240a constitutes the "fixed valve seat" as described above. By operating and advancing or retracting the needle valve body 220, a passage effective cross-sectional area of a partial orifice 250 defined by an upstream end 232a of the slit 232 and the step-part circumferential edge 240a can be changed. The fuel entering the annular fuel space Fs through the body IN-port 212 passes through the partial orifice 250, then passes through the needle fuel passage made up of the needle hollow part 230, and subsequently passes through the tip opening 230a of the needle valve body 220, before being supplied to the fuel discharge part Fout. Therefore, by operating the needle valve body 220, an amount of the fuel supplied to the fuel discharge part Fout can be adjusted so as to adjust the air-fuel ratio of the air-fuel mixture.

Referring to FIG. 4, the upstream end 232a of the slit 232 may be made up of a surface inclined downward toward the front in a cross section. The upstream end 232a of the slit 232 may be made up of a straight line orthogonal to the axis Ax in a front view or may have a shape convexly curved toward the rear end of the needle valve body 220 (FIG. 6).

As shown in FIG. 4, when the upstream end 232a is made up of a surface inclined downward toward the front in a cross section of the upstream end 232a of the slit 232, an inclination angle θ (FIG. 4) may be set between 15° and 60°, or may preferably be set to an angle less than 30°, relative to a line parallel to the axis Ax on an outer circumferential surface of the tip portion 222 of the needle valve body 220. This can suppress an abrupt change in amount of the fuel entering the needle hollow part 230 from the annular fuel space Fs. As shown in FIG. 7, when the upstream end 232a of the slit 232 is formed into a convexly curved shape toward the upstream side in a front view of the slit 232, this can suppress an abrupt change in amount of the fuel passing through the partial orifice 250 due to an operation of the needle valve body 220. Therefore, this can alleviate an excessively sensitive reaction of the amount of the fuel passing through the partial orifice 250 to the operation of the needle valve body 220.

Referring to FIG. 4, in needle valve body 220, the diameter of the tip portion 222 having an outer shape circular in cross section is substantially the same as the inner diameter of the small diameter space 204 of the carburetor body B receiving the tip portion 222, and the tip portion 222 is closely fitted into the small diameter space 204. The length dimension of the tip portion 222 can be made longer than the conventional one.

The tip region Te (FIGS. 6 and 7) of the needle valve body 220 has a hollow structure with a slit as described above. This structure can increase the degree of freedom of elastic deformation in the tip region Te. This elastic deformation can keep the tip region Te in close contact with an inner wall of the small diameter space 204 of the carburetor body B. Therefore, high sealing performance can be maintained in the tip region Te of the needle valve body 220. Additionally, this can prevent axial deviation of the tip portion 222 of the needle valve body 220.

Figure 8:
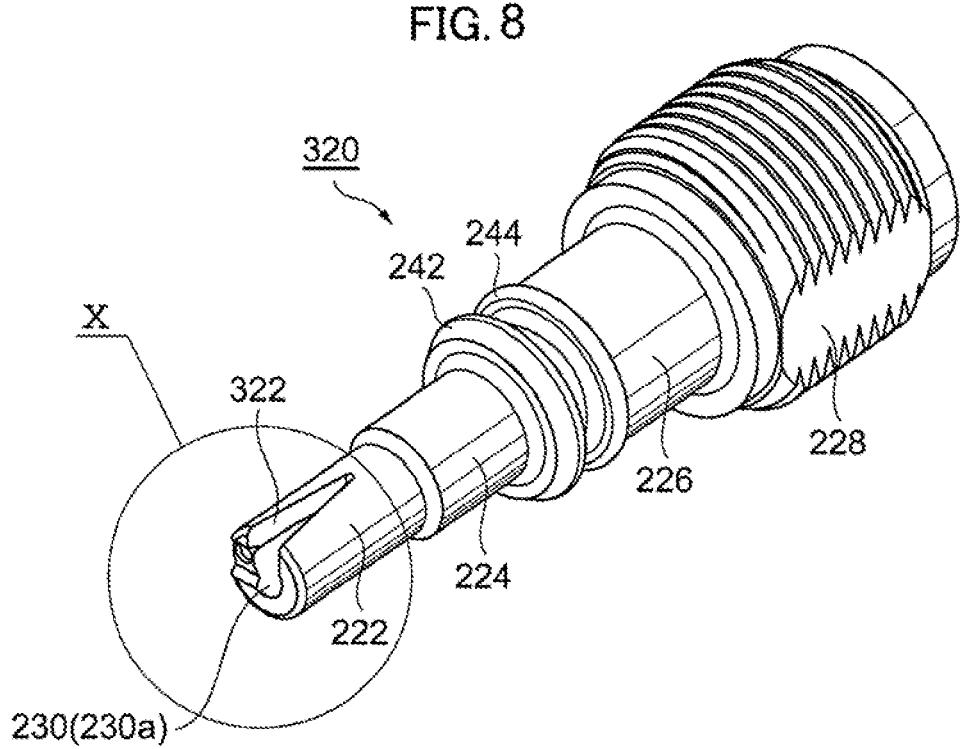
FIG. 8 shows a perspective view of a needle valve body of a second specific example.

FIG. 8 and subsequent drawings are figures for explaining other specific examples related to the needle valve body Nv. In the description of these other specific examples, the same elements as those of the needle valve body 220 of the first specific example described above are denoted by the same reference numerals and will not be described.

Figure 9:
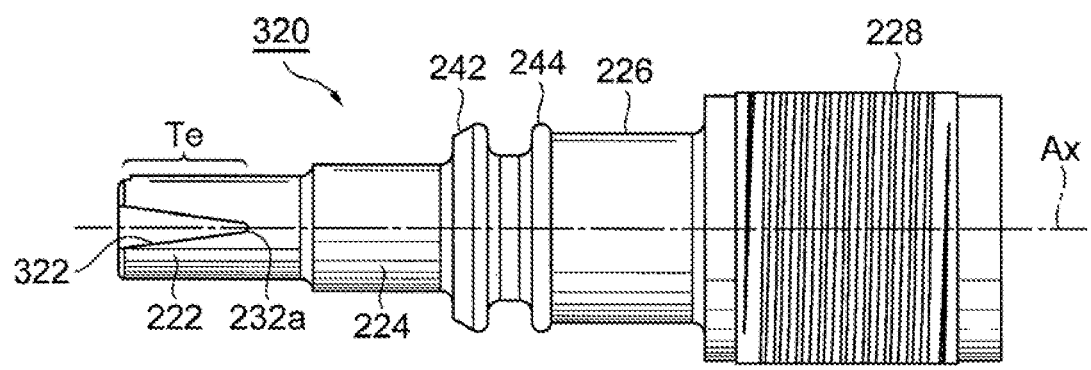
FIG. 9 shows a front view of the needle valve body of the second specific example.
Figure 10:
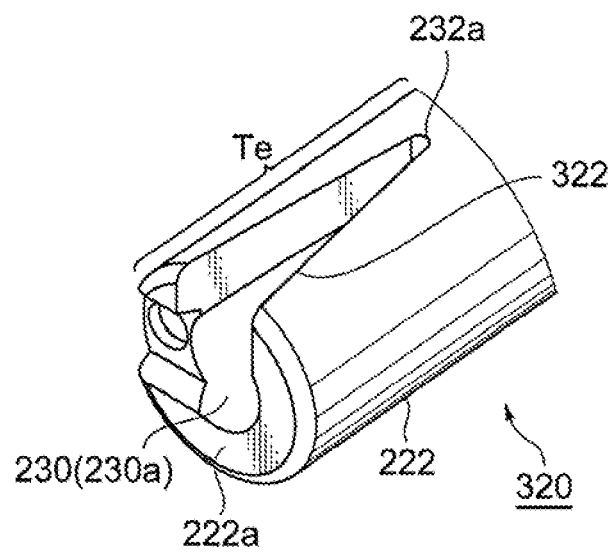
FIG. 10 shows an enlarged view of a tip portion of the needle valve body of the second specific example indicted by X of FIG. 8.

FIGS. 8 to 10 show a needle valve body 320 of a second specific example. The second needle valve body 320 has a hollow structure with a slit in common with the first needle valve body 220. While the slit 232 included in the first needle valve body 220 described above is substantially rectangular in a front view, a slit 322 included in the second needle valve body 320 is different in that the slit 232 has a substantially isosceles-triangular shape in a front view (FIG. 9). Specifically, the slit 322 has a shape having an opening area gradually enlarging toward the downstream side with the upstream end 232a (FIGS. 8 and 9) defined as the apex.

According to the second needle valve body 320, when the fuel adjustment is performed with a portion corresponding to the upstream end 232a of the slit 322, the portion has a small width, so that a fine adjustment can advantageously be made.

As with the first needle valve body 220, the second needle valve body 320 has the needle hollow part 230. The needle hollow part 230 may have a conical shape expanding toward the tip in a manner corresponding to the slit 322 having a substantially triangular shape in a front view, or may have a columnar shape. Also, the needle hollow part 230 included in the second needle valve body 320 may have an arbitrary cross-sectional shape such as a substantially rectangular cross section or a substantially semicircular cross section.

Figure 11:
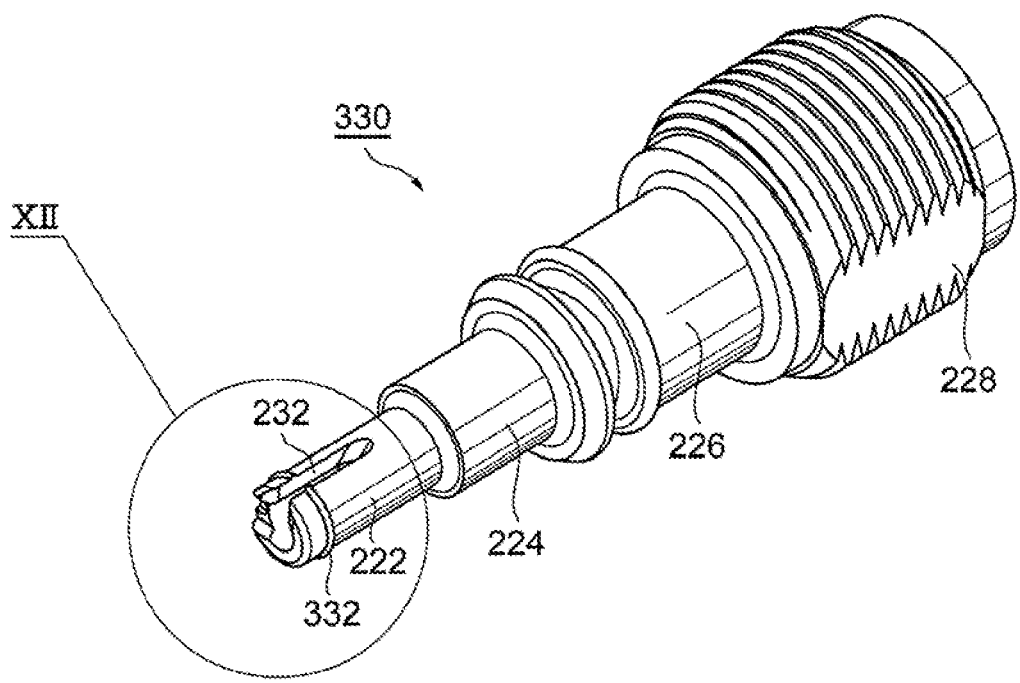
FIG. 11 shows a perspective view of a needle valve body of a third specific example.
Figure 12:
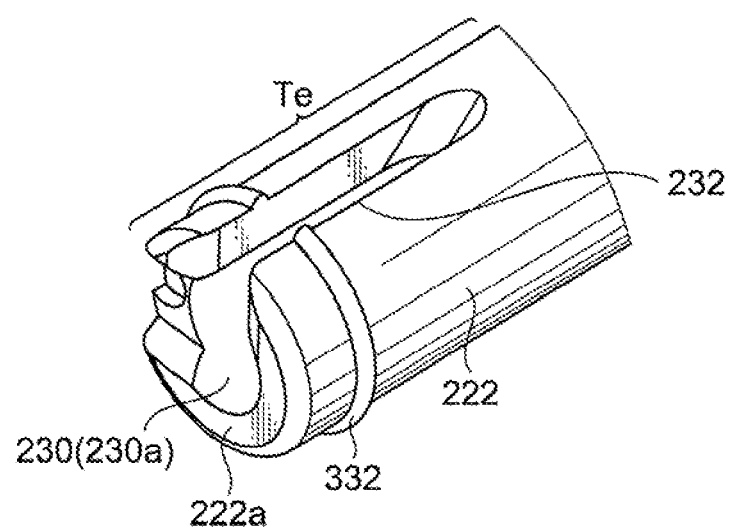
FIG. 12 shows an enlarged view of a tip portion of the needle valve body of the third specific example indicted by XII of FIG. 11.

FIGS. 11 and 12 show a needle valve body 330 of a third specific example. The third needle valve body 330 shown in the figures is also a modification of the first needle valve body 220 (FIG. 5). The needle valve body 330 has a partially lacked substantially annular first ridge 332 in the tip portion and in the vicinity of the tip surface 222a. The first ridge 332 projects radially outward from the needle tip portion 222. The first ridge 332 is also applicable to the second needle valve body 320 (FIG. 8) described above.

The first ridge 332 extends continuously in the circumferential direction except the portion of the slit 232. The substantially annular first ridge 332 is made of a material that can elastically be deformed when a radial compression force is applied. Typically, the third needle valve body 330 is a molded product of synthetic resin excellent in chemical resistance such as a liquid crystal polymer (LCP), and the first ridge 332 is formed by integral molding. In a modification, the first ridge 332 may be made of an elastic sealing member, and a circumferential groove receiving an inner circumferential portion of the elastic sealing member may be formed on a tip part of the third needle valve body 330.

The outer diameter of the first ridge 332 is set to a dimension slightly larger than the inner diameter of the small diameter space 204 of the carburetor body B. Specifically, the outer diameter of the first ridge 332 is set such that when the third needle valve body 330 is disposed in the body small diameter space 204, a compressive deformation occurs in the substantially annular first ridge 332 in the radial direction and thereby brings the first ridge 332 into close contact with the inner circumferential surface defining the small diameter space 204.

The circumferentially extending substantially annular first ridge 332 can allow the fuel in the clearance between the needle valve body 330 and the body hole 202 to flow out through the regular fuel passage via the slit 232.

The needle valve body 330 is placed in an environment where engine vibrations always act thereon. The elasticity of the first ridge 332 can prevent axial deviation of the tip portion 222 of the needle valve body 330.

Figure 13:
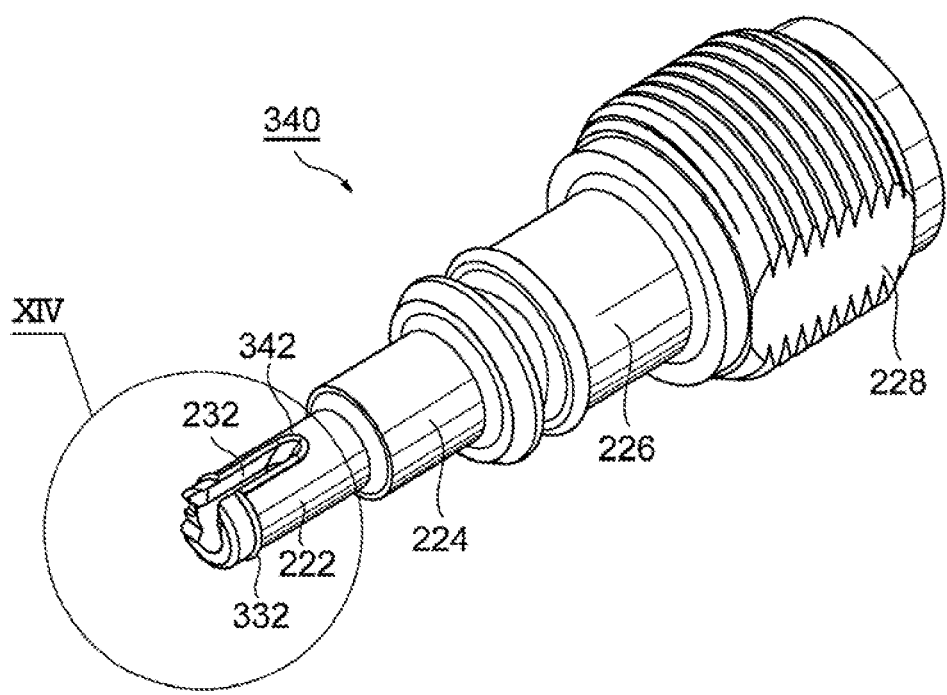
FIG. 13 shows a perspective view of a needle valve body of a fourth specific example.
Figure 14:
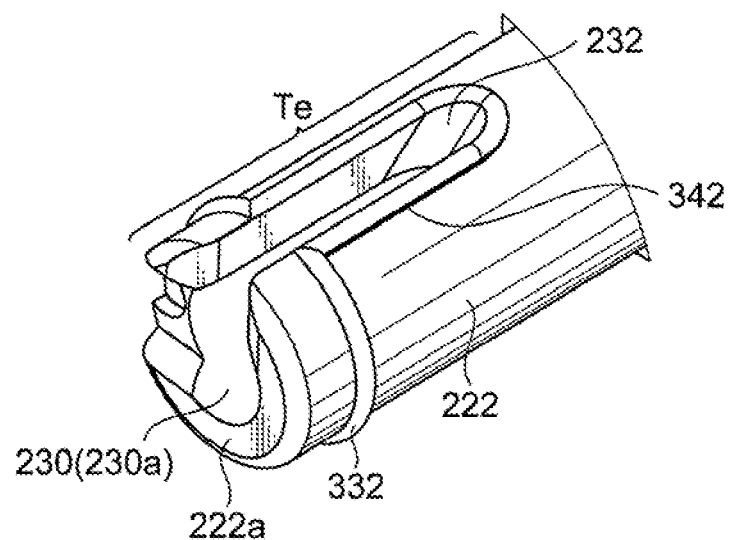
FIG. 14 shows an enlarged view of a tip portion of the needle valve body of the fourth specific example indicted by XIV of FIG. 13.

FIGS. 13 and 14 show a needle valve body 340 of a fourth specific example. The fourth needle valve body 340 shown in the figures is also a modification of the third needle valve body 330 (FIG. 11). The needle valve body 340 includes, in addition to the circumferentially extending first ridge 332, a second ridge 342 extending along an opening peripheral edge of the slit 232, and the second ridge 342 is continuous with the first ridge 332. As with the first substantially annular ridge 332, the second ridge 342 located at the opening peripheral edge of the slit 232 is also applicable to the second needle valve body 320 (FIG. 8) described above, i.e., the needle valve body 320 including the slit 322 that is substantially triangular in a front view.

The second ridge 342 projects radially outward from the needle tip portion 222. The second ridge 342 is made of a material that can elastically be deformed when a radial compression force is applied. Typically, the fourth needle valve body 340 is a molded product of synthetic resin, and the second ridge 342 is formed by integral molding together with the first ridge 332. In a modification, the second ridge 342 may be made of an elastic sealing member, and a groove receiving an inner circumferential portion of the elastic sealing member may be formed on the opening peripheral edge of the slit 232 of the fourth needle valve body 340. This modification is applicable not only when the fourth needle valve body 340 is made of synthetic resin but also when the valve body is made of metal.

The outer diameter, i.e., the height, of the second ridge 342 is set such that when the fourth needle valve body 340 is disposed in the body hole 202 (FIG. 4), a compressive deformation occurs in the second ridge 342 and thereby brings the second ridge 342 on the slit opening peripheral edge into close contact with the inner circumferential surface, i.e., the inner wall, of the small diameter space 204 of the carburetor body B. Typically, the outer diameter or the height of the second ridge 342 may be set to the same as the outer diameter or the height of the first ridge 332.

By disposing the circumferentially extending first ridge 332 and the second ridge 342 on the opening peripheral edge of the slit 232, the sealing can be ensured between the needle valve body 340 and the body hole 202. As a result, the fuel supply amount can be controlled without being affected by fluctuations of the clearance between the needle valve body 340 and the body hole 202. Therefore, the accuracy of the fuel supply amount can be improved. Additionally, the elasticity of the second ridge 342 can prevent axial deviation of the tip portion 222 of the needle valve body 340.

Figure 15:
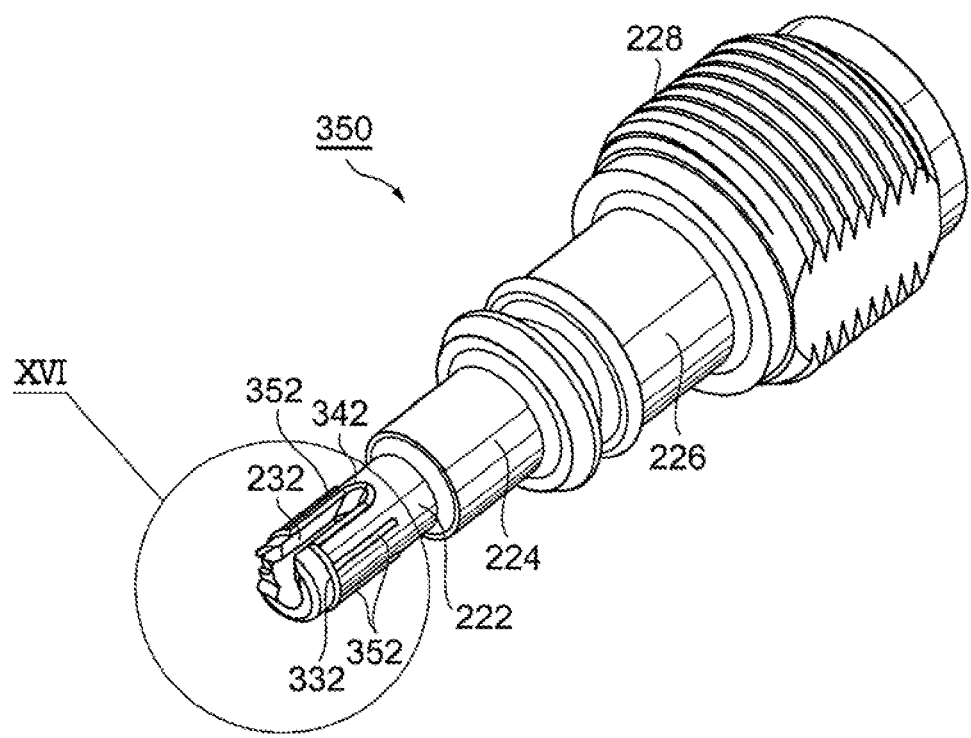
FIG. 15 shows a perspective view of a needle valve body of a fifth specific example.
Figure 16:
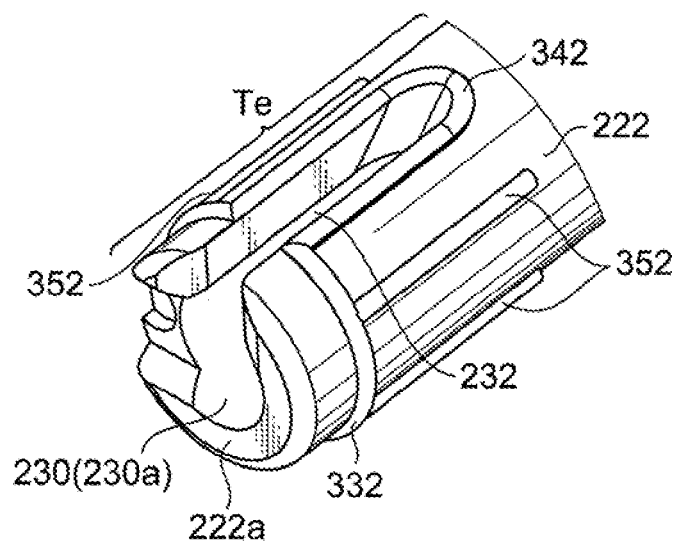
FIG. 16 shows an enlarged view of a tip portion of the needle valve body of the fifth specific example indicted by XVI of FIG. 15.

FIGS. 15 and 16 show a needle valve body 350 of a fifth specific example. The fifth needle valve body 350 shown in the figures is also a modification of the fourth needle valve body 340 (FIG. 13). The needle valve body 350 has multiple third ridges 352 extending in the axis Ax direction on the tip portion 222. The multiple third ridges 352 are circumferentially separated from each other, and preferably, the multiple third ridges 352 are arranged at equal intervals. The multiple third ridges 352 extending in the axis Ax direction can prevent axial deviation of the tip portion 222 of the needle valve body 350.

In the needle valve body 350 shown in the figures, front ends of the third ridges 352 for axial deviation prevention merge with the first ridge 332 extending in the circumferential direction; however, the front ends of the third ridges 352 may be separated from the first ridge 332.

Typically, the fifth needle valve body 350 is a molded product of synthetic resin, and the third ridges 352 are formed by integral molding. In a modification, the third ridges 352 may be made up of sealing members, and grooves receiving inner circumferential portions of the sealing members and extending in the axis Ax direction may be formed on the needle tip portion 222. This modification is applicable not only when the fifth needle valve body 350 is made of synthetic resin but also when the valve body is made of metal.

Figure 17:
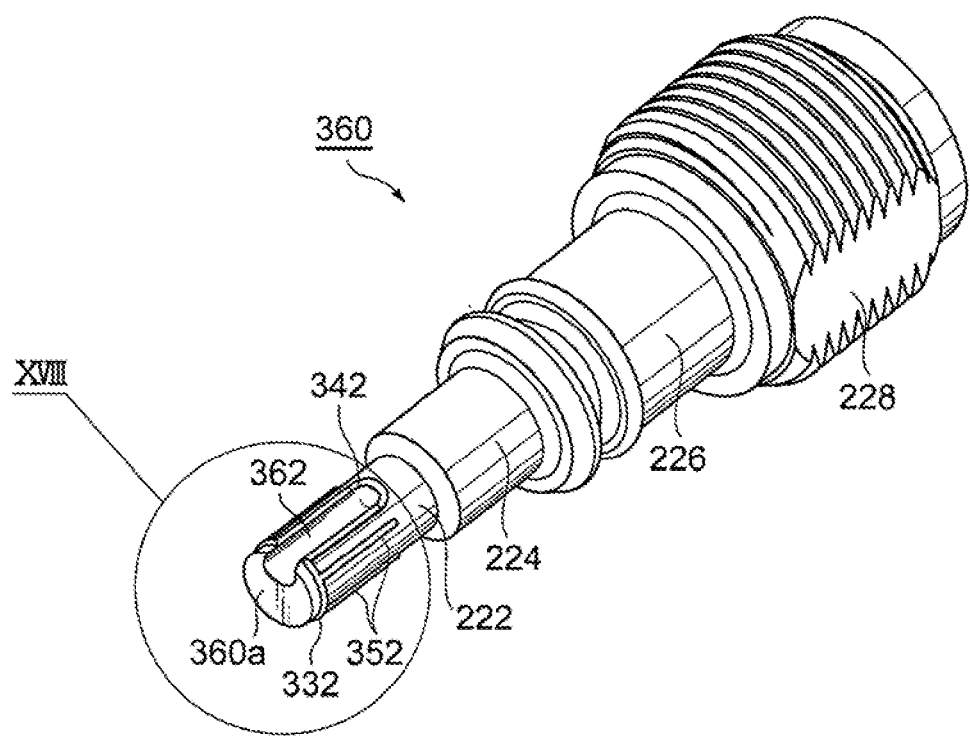
FIG. 17 shows a perspective view of a needle valve body of a sixth specific example.
Figure 18:
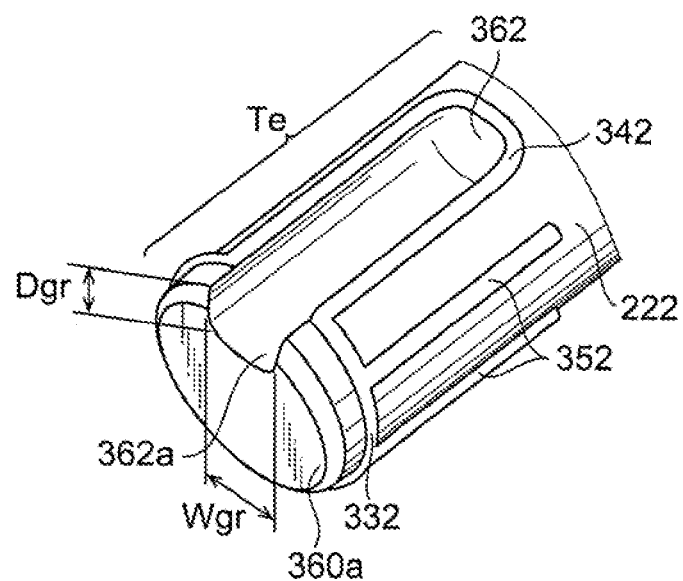
FIG. 18 shows an enlarged view of a tip portion of the needle valve body of the sixth specific example indicted by XVIII of FIG. 17.

FIGS. 17 and 18 show a needle valve body 360 of a sixth specific example. The sixth needle valve body 360 shown in the figures has a solid columnar shape in common with the needle valve bodies disclosed in Patent Documents 3 and 8. The sixth needle valve body 360 has a long groove 362 extending in the axis Ax direction on the circumferential surface of the tip region Te so as to form a "needle fuel passage", and the long groove 362 is opened in a front end surface 360a of the needle valve body 360. The long groove 362 opened forward has a substantially rectangular shape in a front view.

The long groove 362 substantially rectangular in a front view shown in the figures has a flat rectangular cross-sectional shape with a flat long groove bottom surface 362a (FIG. 18) or may have a cross-sectional shape convexly curved downward, for example. The long groove 362 substantially rectangular in a front view shown in the figures has the same depth "Dgr" (FIG. 18) in the axis Ax direction or may have a shape making the depth "Dgr" gradually larger toward the tip. Specifically, the bottom surface 362a of the long groove 362 may be made up of a surface inclined downward toward the front side.

The long groove 362 shown in the figures has substantially the same width "Wgr" (FIG. 18) in the axis Ax direction or may have a shape having the width "Wgr" gradually enlarging toward the tip (the downstream side). In other words, the long groove 362 may have a shape tapered toward the upstream side in a front view.

The sixth needle valve body 360 is a molded product made of synthetic resin such as liquid crystal polymer (LCP), for example. The sixth needle valve body 360 has the first circumferentially extending ridge 332 described above, and the first ridge 332 is formed by integral molding.

The sixth needle valve body 360 also preferably has the second ridge 342 extending along the opening peripheral edge of the long groove 362. The second ridge 342 is also made of resin by integral molding.

As shown in the figures, the sixth needle valve body 360 may have the third ridges 352 along with the second ridge 342. The third ridges 352 are also made of resin by integral molding.

Figure 19:
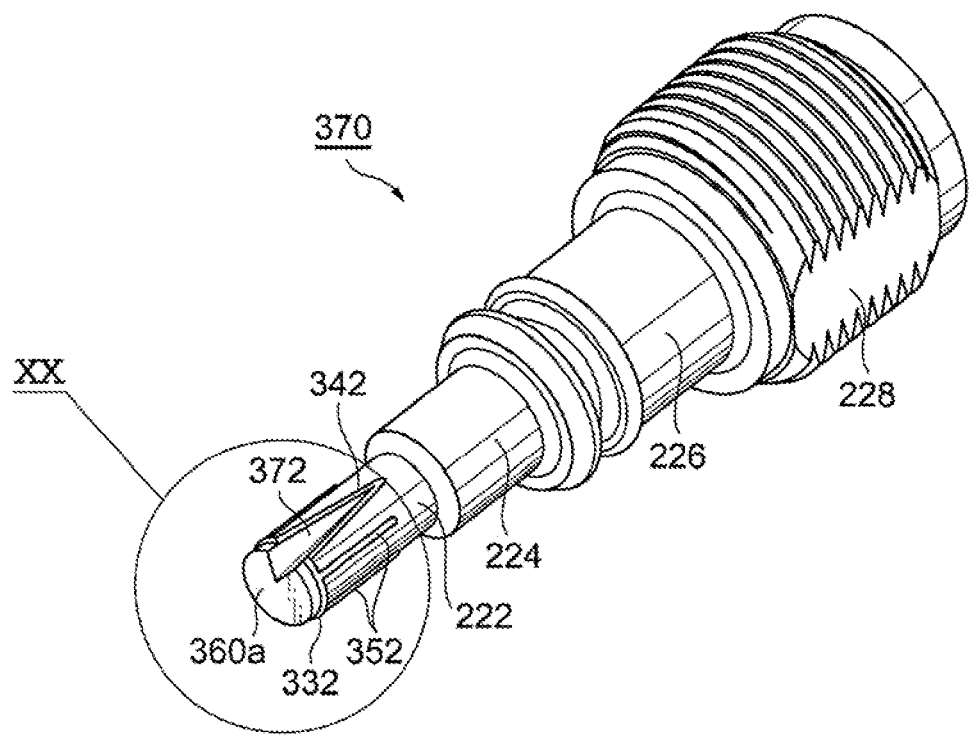
FIG. 19 shows a perspective view of a needle valve body of a seventh specific example.
Figure 20:
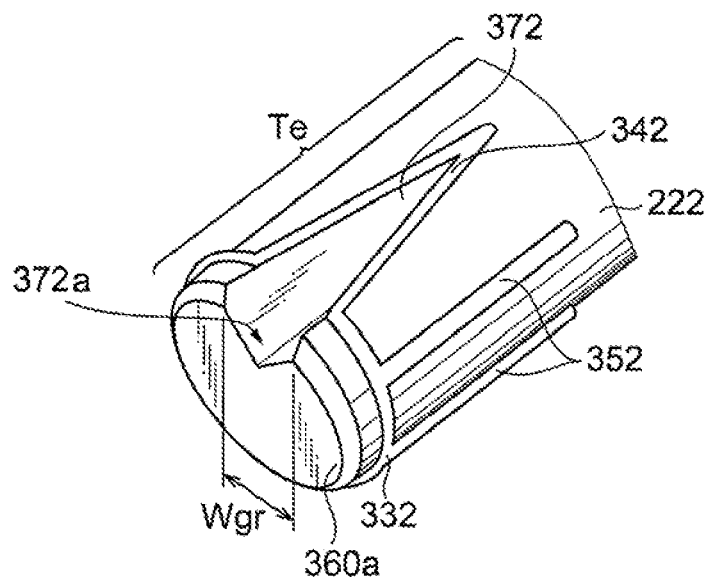
FIG. 20 shows an enlarged view of a tip portion of the needle valve body of the seventh specific example indicted by XX of FIG. 19.
Figure 21:
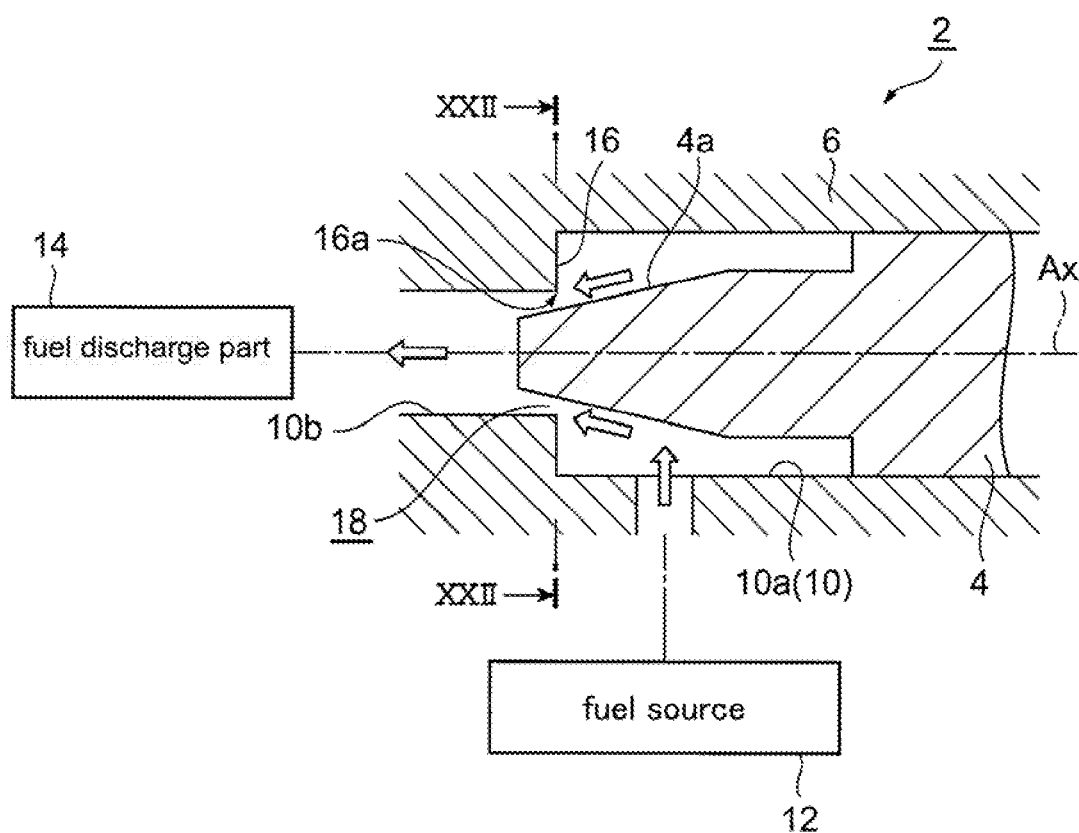
FIG. 21 shows a diagram for explaining an overview of a manual fuel control device r of a whole circumference orifice type.
Figure 22:
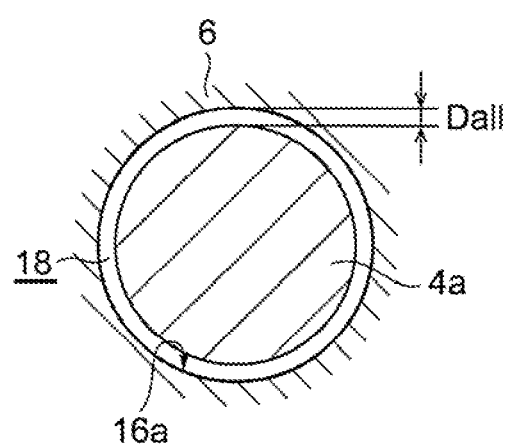
FIG. 22 shows a cross-sectional diagram taken along a line XXII-XXII of FIG. 21.
Figure 23:
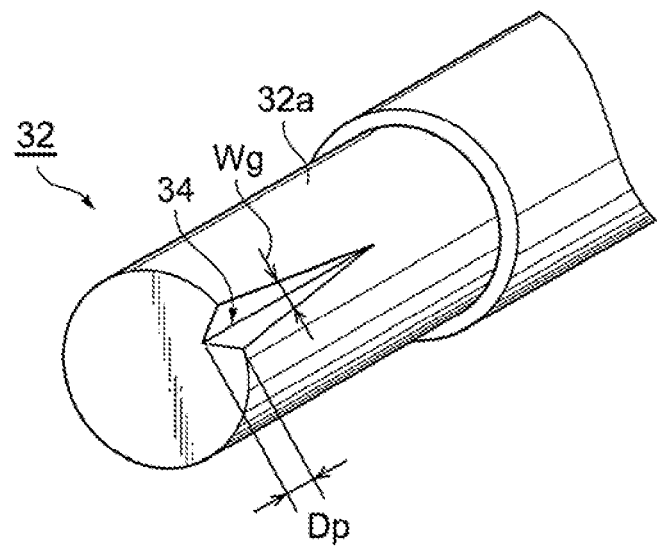
FIG. 23 shows a view for explaining an overview of a conventional needle valve body included in a manual fuel control device of a partial orifice type.
Figure 24:
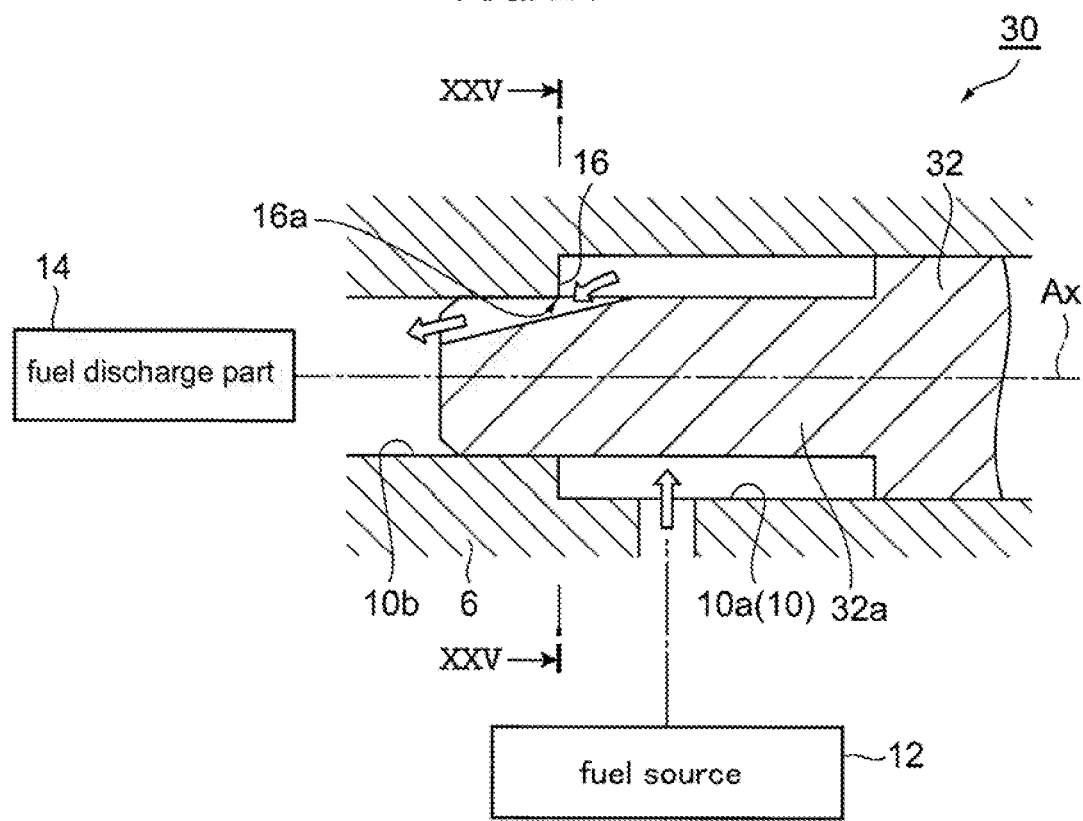
FIG. 24 shows a diagram for explaining an overview of a manual fuel control device including the needle valve body shown in FIG. 23.
Figure 25:
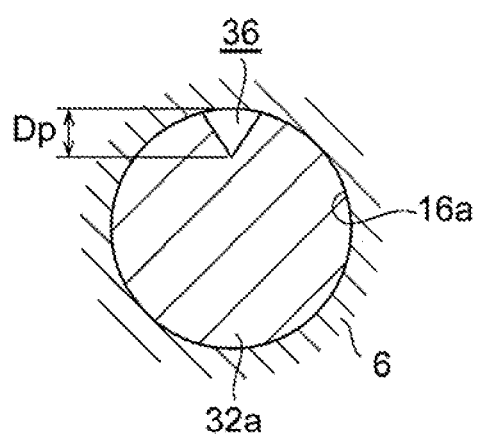
FIG. 25 shows a diagram for explaining an orifice formed in the partial orifice type, showing a cross-sectional diagram taken along a line XXV-XXV of FIG. 24.

FIGS. 19 and 20 show a needle valve body 370 of a seventh specific example, which is a modification of the sixth needle valve body 360. The seventh needle valve body 370 shown in the figures has a solid columnar shape in common with the sixth needle valve body 360 described above. Although the sixth needle valve body 360 has the long groove 362 having a substantially rectangular shape in a front view, the seventh needle valve body 370 has a long groove 372 that is substantially isosceles-triangular in a front view.

In a cross section of the long groove 372 that is substantially isosceles-triangular in a front view, a bottom surface 372*a* thereof has a V shape (FIG. 20) or may be made up of a flat surface.

100 engine system to which a carburetor according to the present invention is applied
102 internal combustion engine main body
CA carburetor
Fc Fuel control device according to the present invention
B carburetor body
200 fuel supply passage
Fout fuel discharge part
202 body hole
Nv needle valve body
220 first needle valve body
Te needle valve body tip region
230 needle hollow part
Ax axis
232 slit
240 carburetor body step part
240*a* step-part circumferential edge
250 partial orifice
320 second needle valve body
322 second needle valve body slit
330 third needle valve body
332 circumferentially extending first ridge
340 fourth needle valve body
342 second ridge on slit opening peripheral edge
350 fifth needle valve body
352 third ridge for axial deviation prevention
360 sixth needle valve body
360*a* sixth needle valve body tip surface
362 long groove
370 seventh needle valve body

What is claimed is:

1. A carburetor receiving air filtered by an air cleaner to generate an air-fuel mixture and supplying the air-fuel mixture to an engine main body, comprising:
   an air-fuel mixture generation passage for generating the air-fuel mixture;
   a fuel discharge part supplying fuel to the air-fuel mixture generation passage;
   a fuel supply passage supplying fuel from a fuel source to the fuel discharge part; and
   a fuel control device including a manually operated needle valve body, wherein by operating the needle valve body, an amount of fuel passing through the fuel supply passage is adjusted, wherein
   the needle valve body includes
   a needle hollow part extending in an axial direction and opened forward in a tip region of the needle valve body, and
   a slit formed in the tip region of the needle valve body, extending in the axial direction from a tip surface of the needle valve body, and communicating with the needle hollow part, wherein
   a body of the carburetor includes
   a body hole formed in the carburetor body and receiving the needle valve body in a longitudinally displaceable manner along an axis, and
   a step-part circumferential edge formed in the body hole and constituting a fixed valve seat forming an orifice with the slit, wherein
   the orifice is adjusted in size by operating the needle valve body, wherein
   by adjusting the size of the orifice, an amount of the fuel supplied from the fuel source through the orifice and then through the needle hollow part to the fuel discharge part can be adjusted.

2. The carburetor of claim 1, wherein the needle valve body is made of metal.

3. The carburetor of claim 1, wherein the needle valve body is a molded product of synthetic resin.

4. The carburetor of claim 1, wherein
   the needle valve body includes a first ridge having an outer diameter larger than the inner diameter of the body hole on a tip part of the needle valve body, and wherein
   the first ridge continuously extends in a circumferential direction on a portion excluding the slit.

5. The carburetor of claim 4, wherein
   the needle valve body is a molded product of synthetic resin, and wherein the first ridge is integrally molded with the needle valve body.

6. The carburetor of claim 4, wherein
   the needle valve body further includes a second ridge having an outer diameter larger than the inner diameter of the body hole, and wherein
   the second ridge continuously extends on an opening peripheral edge of the slit.

7. The carburetor of claim 6, wherein
   the needle valve body is a molded product of synthetic resin, and wherein
   the second ridge is integrally molded with the needle valve body.

8. The carburetor of claim 4, wherein
   the needle valve body further includes multiple third ridges having an outer diameter larger than the inner diameter of the body hole, wherein
   the third ridges each extend in the axial direction in the tip region of the needle valve body, and wherein
   the multiple third ridges are separated from each other in the circumferential direction of the needle valve body.

9. The carburetor of claim 8, wherein
   the needle valve body is a molded product of synthetic resin, and wherein
   the third ridges are integrally molded with the needle valve body.

10. A carburetor receiving air filtered by an air cleaner to generate an air-fuel mixture and supplying the air-fuel mixture to an engine main body, comprising:
    an air-fuel mixture generation passage for generating the air-fuel mixture;
    a fuel discharge part supplying fuel to the air-fuel mixture generation passage;
    a fuel supply passage supplying fuel from a fuel source to the fuel discharge part; and
    a fuel control device including a manually operated needle valve body, wherein by operating the needle valve body, an amount of fuel passing through the fuel supply passage is adjusted, wherein
    the needle valve body includes
    a long groove formed in a tip region of the needle valve body and extending in an axial direction, wherein
    a body of the carburetor includes
    a body hole receiving the needle valve body in a longitudinally displaceable manner along an axis, and
    a step-part circumferential edge formed in the body hole and constituting a fixed valve seat forming an orifice with the long groove, wherein the needle valve body includes a first ridge continuously extending in a circumferential direction on a portion excluding the long groove on a tip part of the needle valve body, wherein the first ridge has an outer diameter larger than the inner diameter of the body hole, and wherein when the needle valve body is disposed in the body hole, the first ridge is in close contact with the body hole for sealing between the tip part of the needle valve body and the body hole.

11. The carburetor of claim 10, wherein the needle valve body is a molded product of synthetic resin, and wherein the first ridge is integrally molded with the needle valve body.

12. The carburetor of claim 10, wherein the needle valve body further includes a second ridge having an outer diameter larger than the inner diameter of the body hole, and wherein the second ridge continuously extends on an opening peripheral edge of the long groove.

13. The carburetor of claim 12, wherein the needle valve body is a molded product of synthetic resin, and wherein the second ridge is integrally molded with the needle valve body.

14. The carburetor of claim 10, wherein the needle valve body further includes multiple third ridges having an outer diameter larger than the inner diameter of the body hole, wherein the third ridges each extend in the axial direction in the tip region of the needle valve body, and wherein the multiple third ridges are separated from each other in the circumferential direction of the needle valve body.

15. The carburetor of claim 14, wherein the needle valve body is a molded product of synthetic resin, and wherein the third ridges are integrally molded with the needle valve body.

16. The carburetor of claim 10, further comprising an intermediate seal ridge located in a longitudinally intermediate portion of the needle valve body and in pressure contact with an inner surface of the body hole.

* * * * *